(No Model.)
W. DURYEA.
APPARATUS FOR RECLAIMING GLUTEN OR GLUTINOUS MATTER FROM THE SPENT LIQUOR OF STARCH WORKS.
No. 301,971. Patented July 15, 1884.
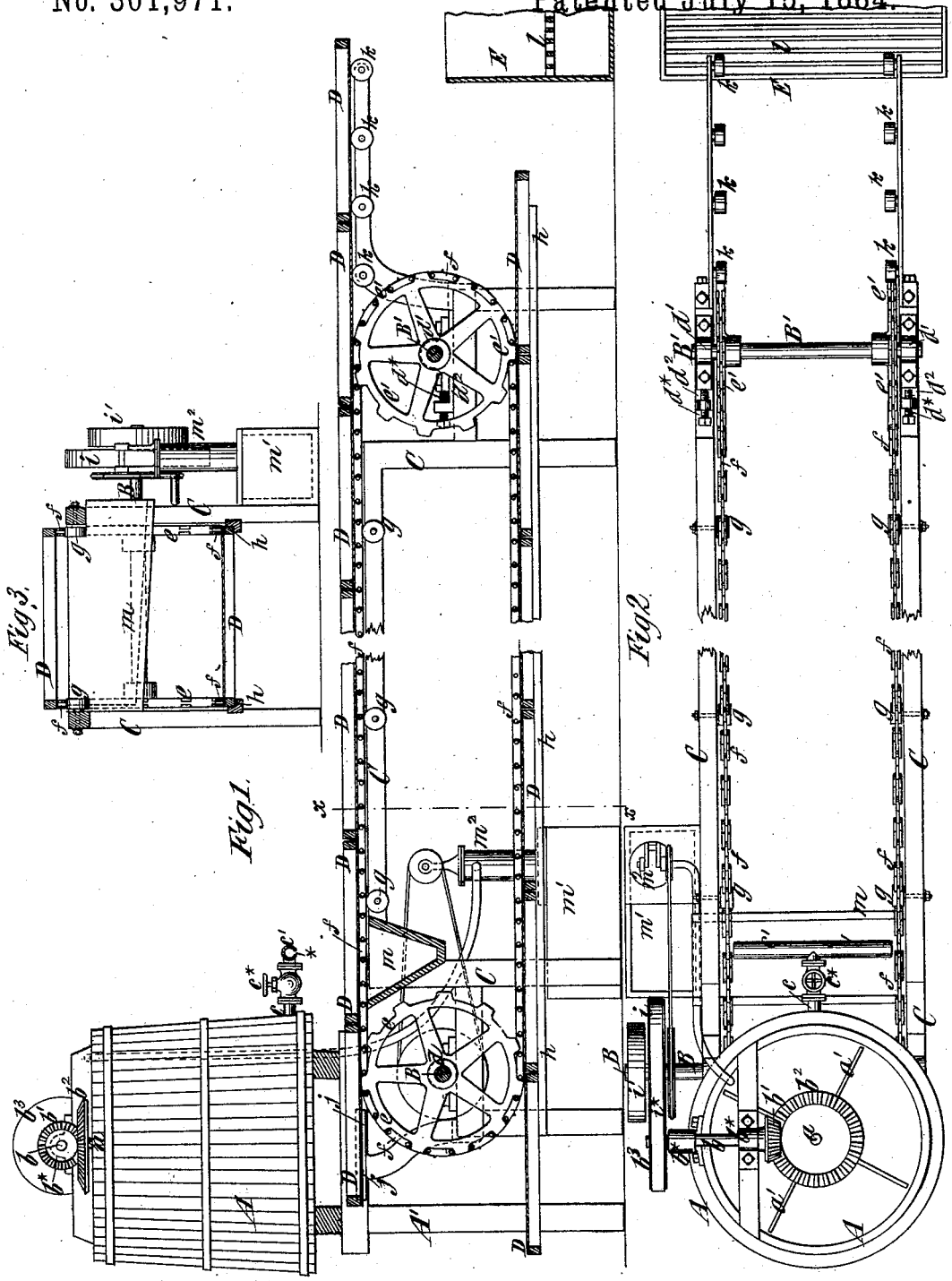

UNITED STATES PATENT OFFICE.

WRIGHT DURYEA, OF BROOKLYN, NEW YORK.

APPARATUS FOR RECLAIMING GLUTEN OR GLUTINOUS MATTER FROM THE SPENT LIQUOR OF STARCH WORKS.

SPECIFICATION forming part of Letters Patent No. 301,971, dated July 15, 1884.

Application filed April 5, 1884. (No model.)

*To all whom it may concern:*

Be it known that I, WRIGHT DURYEA, of the city of Brooklyn, in the county of Kings and State of New York, have invented a new and useful Improvement in Apparatus for Reclaiming Gluten or Glutinous Matter from the Spent Liquor of Starch-Works, of which the following is a specification.

The "spent liquor" discharged from starch-works contains fine gluten and other matters in solution or suspension, which it has been difficult to separate from the large volume of water in which it is contained.

My present invention relates to an apparatus for carrying out the method of reclaiming this fine gluten or glutinous matter from the spent liquor, which is set forth in my application for Letters Patent filed April 5, 1884, and of which the serial number is 126,735. The said method consists in first coagulating the glutinous matters contained in the spent liquor, and in subsequently subjecting them to a sieving or straining operation, for the purpose of removing therefrom by natural gravitation as much as possible of the water with which the matters are combined; or before subjecting the matters to the sieving or straining operation they may be permitted to more or less settle, and the supernatant water may be drawn off and the remaining coagulated and so concentrated mass subjected to the straining or sieving operation.

In my aforesaid apparatus I have shown and described a sieve or strainer which consists of an endless belt of canvas or other fabric supported at its edges by two endless chains or carriers, by which it is moved continuously forward beneath the delivery-pipe, whereby the spent liquor, after coagulation, is delivered upon it, and thence forward to a point of delivery, where the fine gluten or glutinous matter deposited on the sieve by the escaping water is removed therefrom.

In the apparatus which forms the subject of my present invention I employ a tank or vat wherein the glutinous matter contained in the spent liquor is subjected to coagulation, and I likewise employ two endless chains or other carriers—such as cables or bands—which have a continuously progressive movement, and a number of separate sieves or strainers which have bottoms of canvas or other suitable material, and which, when placed upon the chains or carriers by an attendant, are carried forward in continuous series under the delivery-pipe of the tank or vat, and thence forward to a point of automatic delivery. An attendant stands at the rear or delivery end, and as the sieves or strainers drop or are dumped into a bin or receptable by the endless chains or carriers said attendant removes them and places them in a channel or guideway arranged in the lower part of the apparatus in such relation to the lower or returning portions of the chains or carriers that by them the sieves or strainers will be returned to an attendant at the front end of the machine, whose duty it is to place them properly on the chains or carriers for a second transit of the apparatus. By this means the sieves or strainers are passed through the apparatus in unbroken succession.

Inasmuch as the spent liquor is delivered continuously, a small quantity will fall between the sieves or strainers as they pass the delivery-pipe, and in order that this shall not be wasted I arrange below the delivery-pipe, and below the forwardly-moving upper portions of the chains or carriers, a trough by which the water or liquor falling between the sieves or strainers is caught and delivered to a receptacle, from which it is or may be pumped back into the tank or vat or into the delivery-pipe therefrom.

In the accompanying drawings, Figure 1 represents a vertical longitudinal section of the apparatus, the portion of the apparatus between its ends being broken away to reduce the length of the figure, and the tank or vat being shown in elevation. Fig. 2 is a plan of the apparatus; and Fig. 3 is a transverse vertical section thereof on the dotted line $x\ x$, Fig. 1.

Similar letters of reference designate corresponding parts in all the figures.

A designates a tank or vat erected on a suitable support, A', and into which is delivered the spent liquor—*i. e.*, the fluid containing the glutinous matters, which it is the purpose of my invention to reclaim. The fluid is delivered into the tank either by pumping or by gravity in case the vat or tank is sufficiently depressed.

In the tank or vat I have shown a stirrer or agitator, which consists of a vertical shaft, $a$, on which are arms or blades $a'$, and which is rotated by a horizontal shaft, $b$, and bevel-gears $b'$ $b^2$. The shaft $b$ is supported in suitable bearings, $b^*$, and carries a driving-pulley, $b^3$. The tank or vat A has a delivery-pipe, $c$, in which is a cock or valve, $c^*$, and which communicates with a transverse pipe, $c'$, closed at the ends and having at the under side a slit, $*$, or a row of perforations, through which the spent liquor may be continuously and uniformly delivered.

B B' designate two shafts, which are mounted in bearings $d$ $d'$ at opposite ends of a framework, C. Upon these shafts are fixed chain-wheels or carrying-wheels $e$ $e'$, over which pass two endless chains, $f$ $f$. Band-cables or other endless carriers might be substituted for these chains. The bearings $d'$ for the shaft B' are or may be supported on plates $d^2$ on the frame-work C, and by means of set-screws $d^*$ these bearings may be moved away from the shaft B, to produce a proper degree of tension on the chains or carriers $f$ $f$, and between their chain-wheels $e$ $e'$ the chains or carriers are supported by rollers $g$, so as to prevent sagging.

Below the lower or returning portion of the chains or carriers $f$ $f$ are guides or rabbeted pieces $h$, which are opposite the chains or carriers and in near relation thereto. They form a slideway or channel for the return of the sieves or strainers, hereinafter described.

The shaft B constitutes the driving-shaft of the apparatus, and carries a pulley, $i$, which drives the shaft $b$ by means of a belt, $i^*$, passing around the pulleys $i$ $b^3$, and on the shaft B is also fast a pulley, $i'$, for a driving-belt.

In connection with the chains or carriers $f$ $f$, I employ sieves or strainers D, which consist simply of rectangular or square frames, having bottoms of canvas or other material. I prefer to make the sieves or strainers D of square form, because then they may be readily placed on the chains or carriers in any position in which they may be picked up, provided only that the distance between the chains or carriers from outside to outside is equal to the external measurement of one of the sides of the sieve or strainer.

At the front end of the apparatus are guides or ways $j$, which are shown in Fig. 1. These guides or ways consist simply of rabbeted pieces, which project beyond the chains $f$ $f$, and which are so placed relatively to the chains that if the sieves or strainers D are slipped forward in them they will be properly presented to the chains or carriers $f$. The chains or carriers may be constructed in any suitable manner to engage with and carry along the sieves or strainers D. They may, for example, be provided with spurs or pins having a slight projection, and which catch into the frames of the sieves or strainers, which are of wood.

At the rear end of the apparatus, and beyond the chain-wheels $e'$, are roller-supports $k$, on which the sieves or strainers D are projected forward by the continuous forward movement of the chains or carriers, and from which they fall or are dumped into a bin or receptacle, E, which preferably has a grated floor, $l$, at a distance above the bottom. The sieves or strainers naturally fall upside down upon the floor $l$, and the glutinous matter is detached from them, while the sieves or strainers D are taken by an attendant from the bin E and placed in the return channels or guides $h$. These latter are in such close relation to the returning portions of the chains or carriers that the latter catch on the sieves or strainers D and carry them back to the front of the machine, where they are taken by an attendant and again pressed forward in the guides or ways $j$, to bring them upon the chains or carriers $f$ $f$. The sieves or strainers follow each other in almost unbroken succession, and as they pass under the delivery-pipe $c'$ they receive in them the coagulated gluten-water from the vat A, and by the time they have reached a point of delivery the water will have escaped, leaving the glutinous matter deposited on the bottoms of the sieves or strainers. A layer of vegetable material—such, for example, as wheat bran, or fine-cut hay, or other food for stock—may be placed in the sieves or strainers before they receive fluid or semi-fluid from the pipe $c'$, and the said glutinous matters will then be deposited on this vegetable material, and may be thoroughly mixed therewith after delivery from the apparatus. This admixture of coarser vegetable matter will not in any degree impair the value of the material reclaimed, and for some animals it will enhance its value. If the reclaimed glutinous properties are not thus mixed with other material, it may be pressed into cakes and dried, or otherwise prepared in its pure and condensed state.

Although the sieves or strainers follow each other closely, there is a liability of more or less of the fluid delivered from the pipe $c'$ falling between the sieves or strainers, and I therefore arrange under the said pipe a trough, $m$, whereby the fluid falling between the sieves or strainers is caught and delivered into a receptacle, $m'$, from which it may be taken by a pump, $m^2$, and returned to the vat A or the pipe $c'$.

For coagulating the glutinous matter contained in the spent liquor in the tank or vat A, I may employ sulphurous, sulphuric, or muriatic acid, whichever is most desirable or least expensive in the locality where my process is carried out.

What I claim as my invention, and desire to secure by Letters Patent, is—

1. In an apparatus for reclaiming glutinous matters from spent liquor, the combination, with a vat or tank wherein glutinous matters contained in the spent liquor may be coagulated, and which is provided with a delivery-pipe, of endless chains or carriers, wheels for supporting and moving said chains or carriers progressively forward, and sieves or strainers capable of being placed on said chains or carriers, and by them carried successively forward under the said delivery-pipe of the vat or tank, substantially as herein described.

2. The combination, with a vat or tank wherein glutinous matters contained in the spent liquor may be coagulated, and which is provided with a delivery-pipe, of endless chains or carriers and wheels for supporting and moving them forward, sieves or strainers capable of being placed on said chains or carriers, and by them carried successively forward under the said delivery-pipe of the vat or tank, and a slideway or channel arranged below and in such relation to the returning portions of the chains or carriers that sieves or strainers placed in slideway or channel at the rear end of the apparatus will be automatically returned to the front end thereof, substantially as herein described.

3. The combination, with a vat or tank wherein glutinous matters contained in the spent liquor may be coagulated, and which is provided with a delivery-pipe, of endless chains or carriers and sieves or strainers for use in connection with said chains or carriers, and a trough or receptacle arranged below the delivery-pipe from the vat or tank and beneath the forwardly-moving portions of the chains or carriers, whereby the water or liquor falling between the forwardly-moving sieves or strainers will be caught and saved, substantially as herein described.

4. The combination, with the vat or tank A and its delivery-pipe $c\ c'$, of the chains or carriers $f\ f$, their supporting and carrying wheels $e\ e'$, the slideway or channel $h\ h$, adjacent to and below the returning portions of the chains or carriers, the sieves or strainers D, for use in connection with said chains or carriers, and the roller-supports $k$, beyond said chains or carriers, substantially as herein described.

5. The combination, with the vat or tank A and its delivery-pipe $c\ c'$, of the chains or carriers $f\ f$, their supporting and carrying wheels $e\ e'$, the slideway or channel $h\ h$, adjacent to the returning portions of said chains or carriers, sieves or strainers D, for use in connection with said chains or carriers, and receiving-guides in front of the forwardly-moving portions of the chains or carriers, in which the sieves or strainers may be properly presented to the chains or carriers, substantially as herein described.

WRIGHT DURYEA.

Witnesses:
OLIVER N. PAYNE,
ERNEST B. PAYNE.